(12) United States Patent
Greenway et al.

(10) Patent No.: US 9,780,544 B2
(45) Date of Patent: Oct. 3, 2017

(54) ELECTRICAL BOX RECEPTACLE MOUNT

(71) Applicant: Tapco International Corporation, Wixom, MI (US)

(72) Inventors: Nathan D. Greenway, Attica, MI (US); Matthew M. Jackson, Saline, MI (US); Trisha M. Anderson, Pinckney, MI (US); Brian K. McMullen, Waxhaw, NC (US)

( * ) Notice: Subject to any disclaimer, the term of this patent is extended or adjusted under 35 U.S.C. 154(b) by 0 days.

(21) Appl. No.: 14/925,486

(22) Filed: Oct. 28, 2015

(65) Prior Publication Data
US 2016/0134091 A1 May 12, 2016

Related U.S. Application Data

(60) Provisional application No. 62/078,695, filed on Nov. 12, 2014.

(51) Int. Cl.
*H02G 3/10* (2006.01)
*H02G 3/08* (2006.01)
*H02G 3/14* (2006.01)

(52) U.S. Cl.
CPC ............ *H02G 3/10* (2013.01); *H02G 3/081* (2013.01); *H02G 3/14* (2013.01)

(58) Field of Classification Search
CPC H02G 3/10; H02G 3/14; H02G 3/086; H02G 3/081

USPC .......................... 220/3.94, 3.92, 3.3, 3.4, 3.2
See application file for complete search history.

(56) References Cited

U.S. PATENT DOCUMENTS

| | | | |
|---|---|---|---|
| 5,578,791 A | | 11/1996 | Bosse, Jr. |
| 5,675,125 A | * | 10/1997 | Hollinger ................. H02B 1/26 174/66 |
| 5,841,068 A | * | 11/1998 | Umstead ................ H02G 3/126 174/58 |
| 5,920,033 A | | 7/1999 | Bosse, Jr. |
| 5,952,610 A | | 9/1999 | Bosse, Jr. |
| 6,133,524 A | | 10/2000 | Bosse, Jr. |
| 6,303,858 B1 | | 10/2001 | Bosse, Jr. |
| 6,417,447 B1 | | 7/2002 | Bosse, Jr. |
| 2009/0255703 A1 | * | 10/2009 | Vigorito ................. H02G 3/081 174/67 |
| 2014/0262483 A1 | * | 9/2014 | Petak ...................... H02G 3/18 174/481 |

\* cited by examiner

*Primary Examiner* — Stephen Castellano
(74) *Attorney, Agent, or Firm* — Quinn IP Law

(57) ABSTRACT

A receptacle assembly for attachment to a mounting surface is provided and includes a receptacle mount having a flange attachable to the mounting surface. A deck of the receptacle mount extends from the flange opposite the mounting surface and a hood extends from the deck opposite the mounting surface. An electrical box is attachable to the rearward side of the receptacle mount and is disposed entirely between a forward edge of the hood and a back of the flange of the receptacle mount, such that none of the electrical box is recessed into the mounting surface.

6 Claims, 4 Drawing Sheets

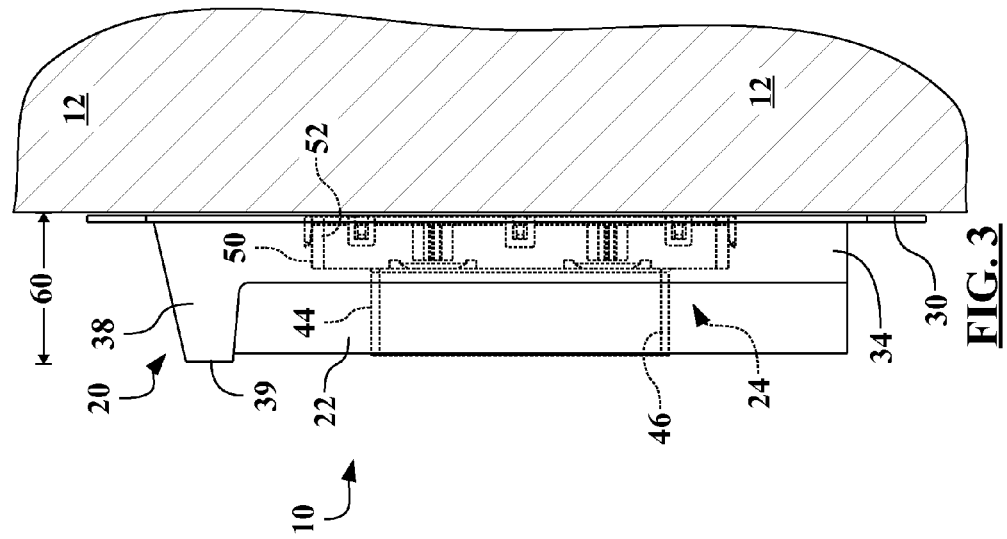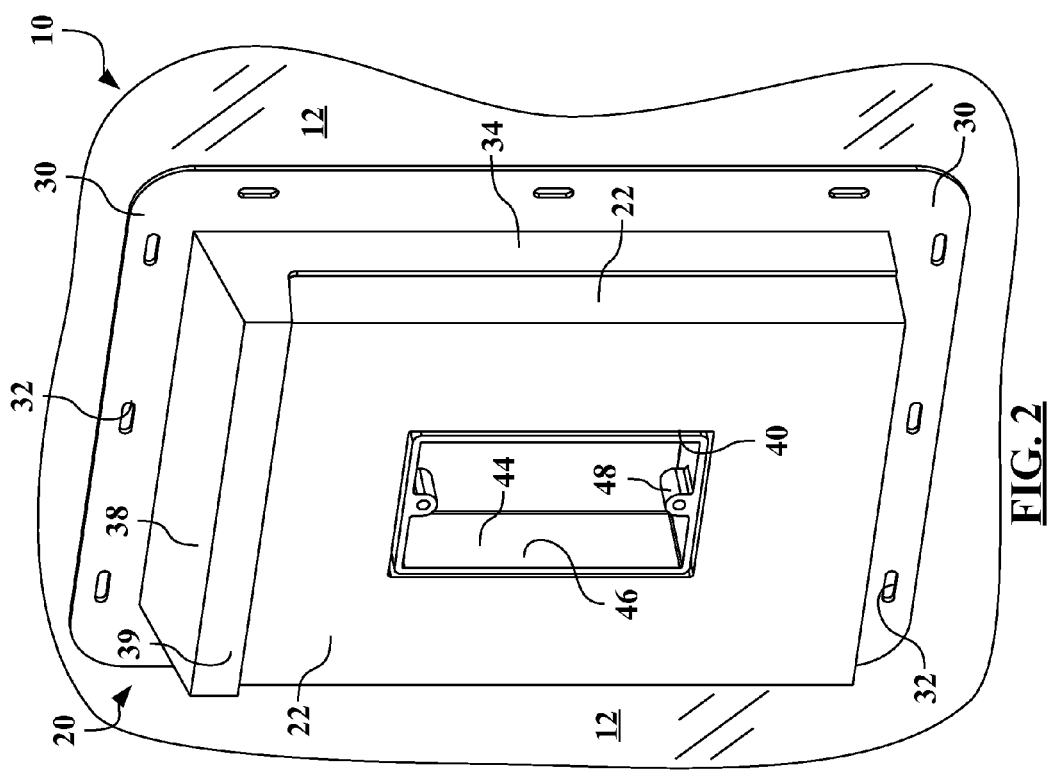

ized. Any numerical designations, such as "first" or "second" are illustrative only and are not intended to limit the scope of the claims in any way.
ELECTRICAL BOX RECEPTACLE MOUNT

CROSS-REFERENCE TO RELATED APPLICATIONS

This application claims the benefit of U.S. Provisional Application No. 62/078,695, filed Nov. 12, 2014, which is hereby incorporated by reference in its entirety.

TECHNICAL FIELD

This disclosure relates to wall mounts for electrical boxes and, more particularly, to those cooperating with exterior protective materials, such as siding or cladding.

BACKGROUND

Exterior siding or cladding may be used to protect the walls of structures from the effects of weather and the ingress of moisture. Additionally, siding or cladding may provide aesthetic benefits.

SUMMARY

A new receptacle assembly for attachment to a mounting surface is provided. The receptacle assembly includes a receptacle mount having a flange attachable to the mounting surface. The receptacle mount may have a deck that extends from the flange opposite the mounting surface and a hood that extends from the deck opposite the mounting surface.

A face block may be attached to the deck of the receptacle mount. The face block defines a face window. An electrical box is attachable to the rearward side of the receptacle mount. The electrical box is disposed entirely between a forward edge of the hood and a back of the flange of the receptacle mount. Therefore, none of the electrical box is recessed into the mounting surface.

The above features and advantages, and other features and advantages, of the present disclosure are readily apparent from the following detailed description of some of the best modes and other embodiments for carrying out the disclosure, which is defined solely by the appended claims, when taken in connection with the accompanying drawings.

BRIEF DESCRIPTION OF THE DRAWINGS

FIG. 2 is a schematic, isometric view of the receptacle assembly shown in FIG. 1;

FIG. 3 is a schematic, side view of the receptacle assembly shown in FIGS. 1 and 2;

DETAILED DESCRIPTION

Figure 1:
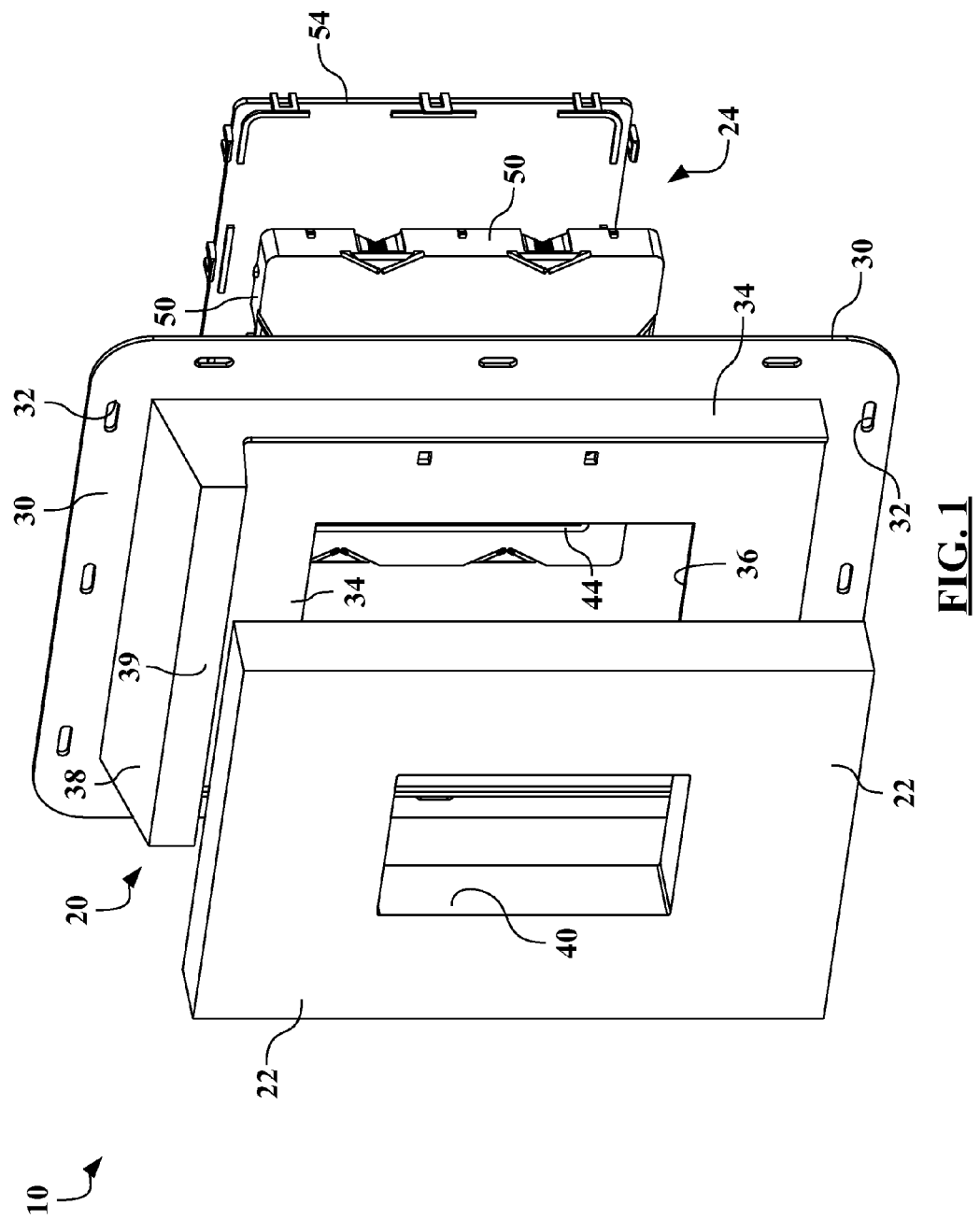
FIG. 1 is a schematic, exploded, isometric view of a receptacle assembly.

Referring to the drawings, like reference numbers correspond to like or similar components wherever possible throughout the several figures. FIGS. 1-3 are discussed simultaneously. FIG. 1 shows an exploded view a receptacle assembly 10. FIG. 2 shows a non-exploded view of the receptacle assembly 10 affixed to an exterior or interior mounting surface, such as a wall 12. FIG. 3 shows a side view of the receptacle assembly 10 and the wall 12. In the figures, the wall 12 is illustrated as substantially vertical; however, the wall 12 may be angled or slanted.

While the present disclosure may be illustrated with respect to particular industries or applications, those skilled in the art will recognize the broader applicability of the products and methods described herein. For example, similar structures, methods, or combinations thereof, may be used in other industries, including, without limitation: household items, electronic devices, or farm or industrial equipment.

Those having ordinary skill in the art will also recognize that terms such as "above," "below," "upward," "downward," et cetera, are used descriptively of the figures, and do not represent limitations on the scope of the appended claims. Any numerical designations, such as "first" or "second" are illustrative only and are not intended to limit the scope of the claims in any way.

Features shown in one figure may be combined with, substituted for, or modified by, features shown in any of the figures. Unless stated otherwise, no features, elements, or limitations are mutually exclusive of any other features, elements, or limitations. Any specific configurations shown in the figures are illustrative only and the specific configurations shown are not limiting of the claims or the description.

The receptacle assembly 10 illustrated in the figures includes multiple components assembled together. A receptacle mount 20 is generally adjacent to the wall 12, and a face block 22 is attached to the front side, which is the side opposite the wall 12, of the receptacle mount 20. An electrical box 24 is mated to the back side of the receptacle mount 20 and sits or nestles between the receptacle mount 20 and the wall 12.

The receptacle mount 20 may be formed as a one-piece, unitary component. A receptacle flange 30 forms one or more edges of the receptacle mount 20 and abuts the wall 12. One or more flange holes 32 may be formed in the flange 30, such that nails or other fasteners may be used to attach the receptacle mount 20 to the wall 12. After assembly, a back or rearward side of the flange 30 abuts the wall 12.

A deck 34 extends forward from the flange 30, opposite the wall 12, and forms a pocket in which a portion of the electrical box 24 sits. A receptacle window 36 is defined in the deck 34 and creates an opening through which portions of the electrical box 24 may extend.

A hood 38 extends from the flange 30 and the deck 34 at the top of the receptacle mount 20. At least a front or forward edge 39 of the hood 38 overhangs the deck 34 and prevents or limits movement of water or moisture from above the receptacle mount 20 into the receptacle window 36.

The face block 22 is attached to the front side of the deck 34 of the receptacle mount 20. The face block 22 may be attached via adhesives, fasteners driven through the deck 34 into the face block 22, interlocking structures, or combinations thereof.

The face block 22 may extend upward into the hood 38, such that a portion of the hood 38 extends below the top portion of the face block 22, and the face block 22 is completely between the deck 34 and the forward edge 39. The face block 22 defines a face window 40, through which portions of the electrical box 24 may extend, as best viewed in FIG. 2.

Figure 5:
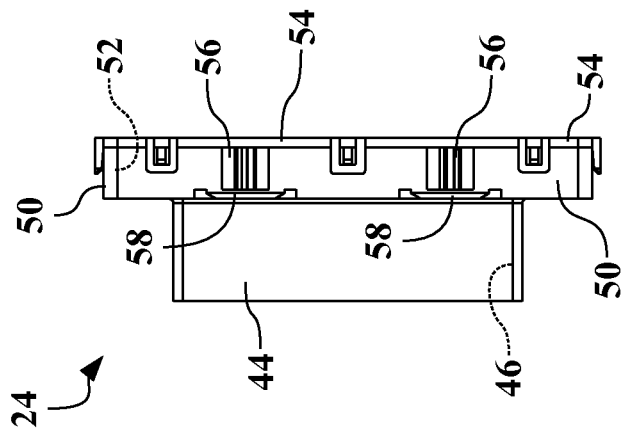
FIG. 5 is a schematic, side view of the electrical box shown in FIG. 4.
Figure 4:
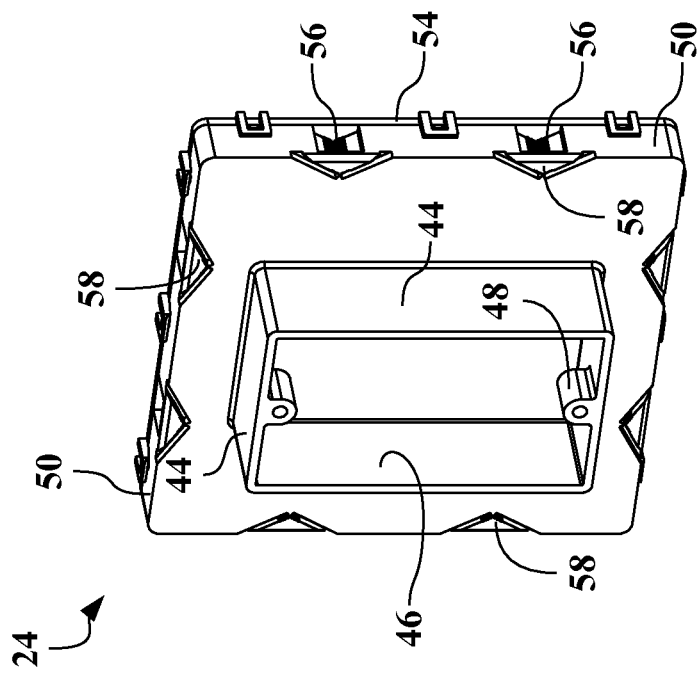
FIG. 4 is a schematic, isometric view of an electrical box usable with the receptacle assembly shown in FIGS. 1-3.

Referring now to FIG. 4 and FIG. 5, and with continued reference to FIGS. 1-3, there are shown two views of the electrical box 24, which forms part of the receptacle assembly 10. FIG. 4 shows an isometric view of the electrical box 24, similar to the orientation shown in FIG. 2; and FIG. 5 shows a side view of the electrical box 24, similar to the orientation shown in FIG. 3 (which illustrates the outline of the electrical box 24 in dashed lines).

The forward-most portion of the electrical box 24, which is the furthest portion from the wall 12 when assembled in the receptacle assembly 10, is a block 44. As best viewed in FIG. 2, much of the block 44 extends through the face window 40 of the face block 22. The block 44 defines a block volume 46. The block 44 may be configured to receive standard outlets, plates, switches, or other components, which may be attached to the electrical box via one or more fittings 48. Portions of the components attached to the block 44 and wires connected to such components may also be disposed within the block volume 46.

Behind the block 44 of the electrical box 24 is a vault 50, such that the vault 50 sits between the block 44 and the wall 12. The vault 50 defines a vault volume 52. A backplate 54 caps the rearward portion of the electrical box 24 and generally sits nearest the wall 12.

The vault 50 has one or more wire gateways 56 formed around its perimeter. The wire gateways 56 provide entrance points for wires connected to any of the components of the electrical box 24. The wire gateways 56 may be spring-loaded or breakaway tabs, and may be insulated or have protective grommets to limit passage of moisture to and from the vault 50.

The vault volume 52 of the vault 50 provides space for wires passing through the wire gateways 56, and may allow the wires to bend or flex with greater curvature. Additionally, the vault 50 provides room for larger sizes of wire or greater numbers of wire.

One or more mount pads 58 may be formed on the vault 50, and may be used to affix the electrical box 24 to the rearward side of the receptacle mount 20. In the configuration shown, the mount pads 58 are formed adjacent to the wire gateways 56.

A total box volume is the combination or sum of the block volume 46 and the vault volume 52, and is located entirely forward of the wall 12 and rearward of the forward edge 39 of the hood 38. The total box volume may be used to hold electrical wires and other componentry, including, without limitation: sockets, switches, and GFI breakers. In some configurations, the total box volume is at least eighteen cubic inches, which allows sufficient room for wires and other componentry.

An assembly offset 60 illustrates the total depth or offset of the receptacle assembly 10 from the wall 12. The assembly offset 60 includes the hood 38, the forward edge 39 of which extends beyond or overhangs the face block 22.

As viewed in FIG. 3, which shows the electrical box 24 in dashed lines, all of the total box volume is between the wall 12 and the assembly offset 60, such that the electrical box 24 is not behind the flange 30 and no portion of the electrical box 24 needs to be recessed into a hole in the wall 12. Furthermore, the front of the electrical box 24, which is aligned with the front of the face block 22, is closer to the wall 12 than if the whole volume of the electrical box 24 were disposed within an elongated version of the block 44.

In many configurations of the receptacle assembly 10, the total box volume of the electrical box 24 may exceed eighteen cubic inches. Therefore, the vault 50 of the electrical box 24, and the deck 34 of the receptacle mount 20 in which the vault 50 is disposed, are configured to provide sufficient space to allow the total box volume to be disposed completely outside of the wall 12.

Figure 6:
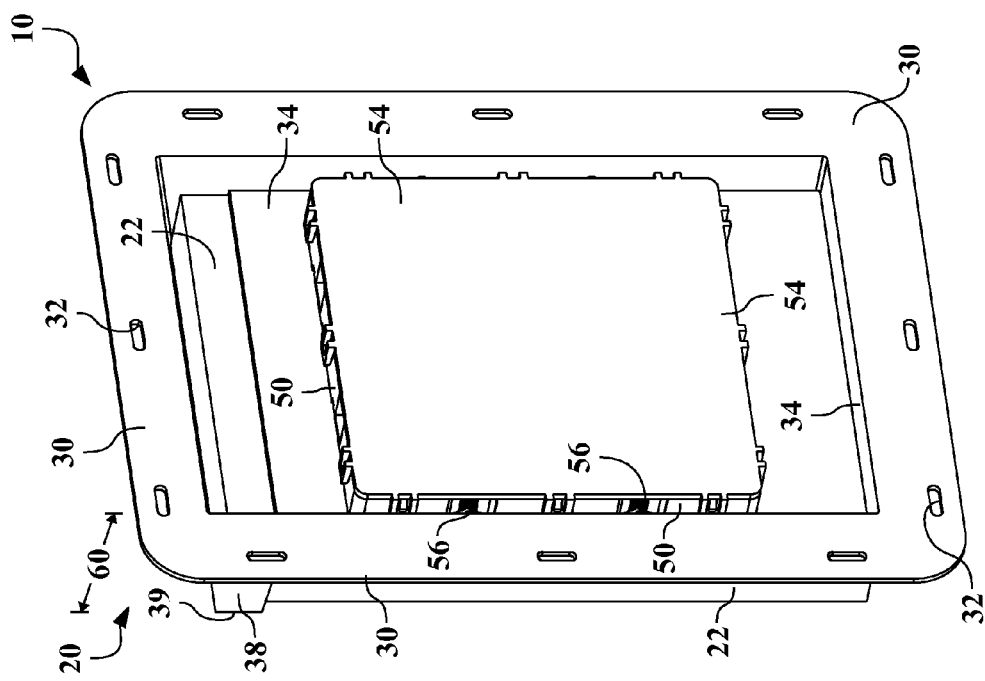
FIG. 6 is a schematic, rearward isometric view of the receptacle assembly without the electrical box.
Figure 7:
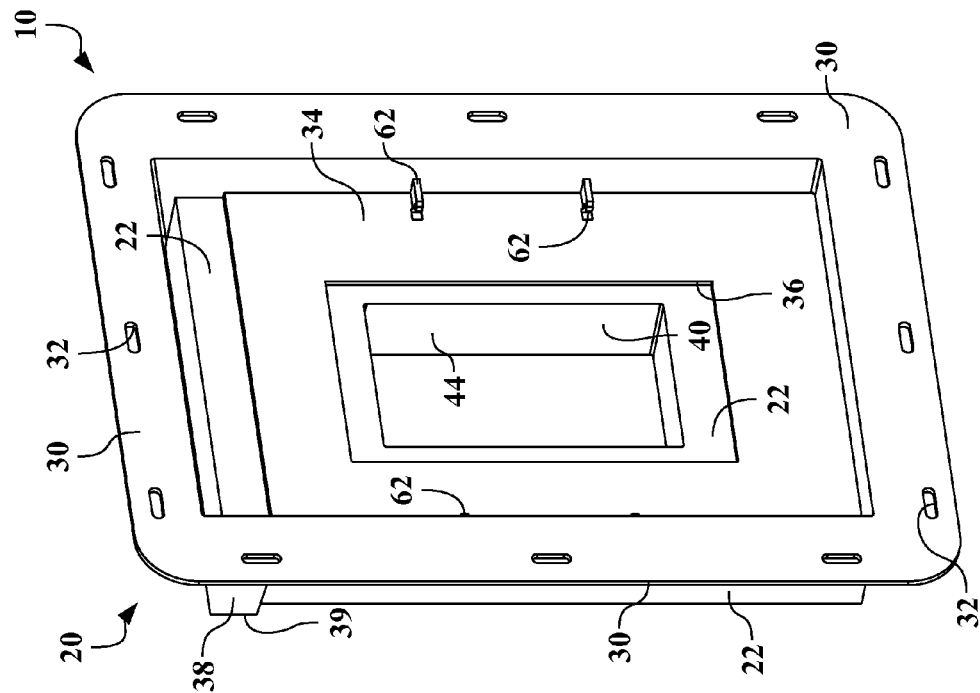
FIG. 7 is a schematic, rearward isometric view of the electrical box mated to the receptacle assembly shown in FIG. 6.

Referring now to FIG. 6 and FIG. 7, and with continued reference to FIGS. 1-5, there are shown two rearward views of the receptacle assembly 10. FIG. 6 shows the receptacle mount 20 and the face block 22 without the electrical box 24. FIG. 7 shows the same view as FIG. 6, but with the electrical box 24 assembled or mated to the remainder of the back side of the receptacle mount 20.

As illustrated in FIG. 6, a plurality of locks 62 may be formed in the receptacle mount 20. The locks 62 provide secure attachment of the electrical box 24 to the receptacle mount 20. The mount pads 58 of the electrical box 24 may be engaged with the locks 62. Alternatively, the mount pads 58 may provide structure through which fasteners, such as staples, nails, or screws, may be driven to attach the electrical box to the receptacle mount 20.

The interaction between the mount pads 58 and the locks 62 also allows some adjustability of the electrical box 24 relative to the receptacle mount 20. Therefore, if the face window 40 is slightly offset relative to the receptacle mount 20, the electrical box 24 may tilt or slide slightly to allow the block 44 to extend through face window 40.

To assemble the receptacle assembly 10, the face block 22 and the receptacle mount 20 may be separately formed and then joined together. For example, a combination of adhesives and staples driven through the deck 34 into the face block 22 may fixedly attach the face block 22 to the receptacle mount 20. This sub-assembly may then be aesthetically finished, such as by painting the combined face block 22 and receptacle mount 20 the same color, such as to match surrounding siding or cladding.

In many configurations of the receptacle assembly 10, the face block 22 may be formed from the same, or similar, materials as the surrounding siding or cladding. This allows the electrical box 24, or the forward portions thereof, to subsequently be attached unpainted or separately finished. The face block 22 and the receptacle mount 20 may be finished in a substantial number of different colors and textures. The face block 22 may be formed from different paintable or prefinished materials, including but not limited to: hardboard, fiber cement, plastic, engineered wood, or natural wood.

The electrical box 24 may then be attached to the sub-assembly of the face block 22 and receptacle mount 20. For example, the mount pads 58 of the electrical box 24 may be inserted into the locks 62 of the receptacle mount 20. Therefore, although the receptacle mount 20 and the face block 22 were painted to match surrounding siding or cladding, the electrical box 24 is not similarly painted. In some configurations, the electrical box 24 may receive a separate coating or finishing before being assembled to the receptacle mount 20 and the face block 22. However, in many instances, the finishing color and texture of the electrical box 24 will be defined by the plastic material from which the electrical box 24 is formed.

After the electrical box 24 is attached to the receptacle mount 20 and the face block 22, the receptacle assembly 10 is substantially complete and ready for worksite installation. An area requiring the electrical box 24 may be selected and proper wiring may be extended through the wall 12. The wires may be disposed within some portion of the total box volume of the electrical box 24 and fasteners may be driven through the flange holes 32 to fixedly attach the receptacle assembly 10 to the wall 12. Siding or cladding may be assembled to the wall 12 such that only portions of the face block 22, the deck 34, and the hood 38 are visible.

The detailed description and the drawings or figures are supportive and descriptive of the disclosure. While some of the best modes and other embodiments for carrying out the disclosure have been described in detail, various alternative designs, configurations, and embodiments exist for practicing the appended claims.

The invention claimed is:

1. A receptacle assembly for attachment to a mounting surface, comprising:
    a receptacle mount having:
        a flange attachable to the mounting surface;
        a deck extending from the flange opposite the mounting surface; and
        a hood extending from the deck opposite the mounting surface;
    a face block attached to the deck, wherein the face block defines a face window and is between the forward edge of the hood and the mounting surface, and wherein the hood overhangs and spans the width of the face block; and
    an electrical box, wherein the electrical box is disposed within the deck of the receptacle mount and the face window of the face block and is entirely between a forward edge of the hood and a back of the flange, such that none of the electrical box is recessed into the mounting surface.

2. The receptacle assembly of claim 1, wherein the interior of the electrical box defines a total box volume of at least eighteen cubic inches, all of which is forward of the mounting surface.

3. The receptacle assembly of claim 2, wherein the face block is formed from one of natural wood and engineered hardwood such that the face block is paintable.

4. A receptacle assembly for attachment to a mounting surface, comprising:
    a receptacle mount having:
        a flange attachable to an exterior of the mounting surface;
        a deck extending from the flange opposite the mounting surface; and
        a hood extending from the deck opposite the mounting surface;
    a face block attached to the deck of the receptacle mount, wherein the face block defines a face window, wherein the face block is between the forward edge of the hood and the mounting surface, such that the hood overhangs and spans the width of the face block and the face window; and
    an electrical box, wherein the electrical box is disposed entirely between a forward edge of the hood and a back of the flange, such that none of the electrical box is recessed into any portion of the structure defining the mounting surface, wherein the electrical box includes:
        a vault portion disposed within the deck of the receptacle mount; and
        a block portion extending from the vault portion opposite the mounting surface, such that the block portion is disposed within the face window of the face block.

5. The receptacle assembly of claim 4, wherein the interior of the electrical box defines a total box volume of at least eighteen cubic inches, all of which is forward of the mounting surface.

6. The receptacle assembly of claim 5, wherein the face block is formed from one of natural wood and engineered hardwood.

\* \* \* \* \*